United States Patent
Chen et al.

(10) Patent No.: US 8,266,628 B2
(45) Date of Patent: *Sep. 11, 2012

(54) SWITCHING BETWEEN MULTIPLE SOFTWARE ENTITIES USING DIFFERENT OPERATING MODES OF A PROCESSOR

(75) Inventors: Xiaoxin Chen, Fremont, CA (US); Alberto J. Munoz, Los Altos, CA (US); Sahil Rihan, Mountain View, CA (US); Robert D. Manchester, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 792 days.

This patent is subject to a terminal disclaimer.

(21) Appl. No.: 12/339,778

(22) Filed: Dec. 19, 2008

(65) Prior Publication Data
US 2009/0100250 A1 Apr. 16, 2009

Related U.S. Application Data

(63) Continuation of application No. 10/829,780, filed on Apr. 21, 2004, now Pat. No. 7,478,388.

(51) Int. Cl.
*G06F 9/455* (2006.01)
*G06F 9/46* (2006.01)

(52) U.S. Cl. ............................................ 718/108; 718/1
(58) Field of Classification Search .................... None
See application file for complete search history.

(56) References Cited

U.S. PATENT DOCUMENTS

| | | | |
|---|---|---|---|
| 6,496,847 B1 * | 12/2002 | Bugnion et al. | 718/1 |
| 7,260,702 B2 * | 8/2007 | Vega et al. | 711/203 |

* cited by examiner

*Primary Examiner* — Jennifer To
*Assistant Examiner* — Eric C Wai

(57) ABSTRACT

The computer program includes a virtualization software that is executable on the new processor in the legacy mode. The new processor includes a legacy instruction set for a legacy operating mode and a new instruction set for a new operation mode. The switching includes switching from the new instruction set to the legacy instruction set and switching paging tables. Each of the new operating mode and the legacy operating mode has separate paging tables. The switch routine is incorporated in a switch page that is locked in physical memory. The switch page has a first section to store a part of switching instructions conforming to the new instruction set and a second section to store another part of the switching instructions conforming to the legacy instruction set.

20 Claims, 9 Drawing Sheets

| SWITCHING FROM HOST TO VMM ||||||
|---|---|---|---|---|---|---|
| STEP | GDTR | CS | DS | CR3 | CODE VPN | MODE |
| 800 | HOST GDT | H-CS | H-DS | HOST PAGE TBL | HVPN-SW | LONG, 64-BIT |
| 804 | HOST GDT | H-CS | H-DS | SWITCH PAGE TBL | HVPN-SW | LONG, 64-BIT |
| 806 | SWITCH GDT | H-CS | H-DS | SWITCH PAGE TBL | HVPN-SW | LONG, 64-BIT |
| 808 | SWITCH GDT | H-CS | S-DS | SWITCH PAGE TBL | HVPN-SW | LONG, 64-BIT |
| 810 | SWITCH GDT | CS-COMP | S-DS | SWITCH PAGE TBL | PPN-SW | LONG, COMP |
| 812 | SWITCH GDT | CS-COMP | S-DS | SWITCH PAGE TBL | PPN-SW | LEGACY |
| 816 | VMM GDT | CS-COMP | S-DS | SWITCH PAGE TBL | PPN-SW | LEGACY |
| 818 | VMM GDT | CS-COMP | S-DS | VMM PAGE TBL | PPN-SW | LEGACY |
| 822 | VMM GDT | CS-COMP | M-DS | VMM PAGE TBL | PPN-SW | LEGACY |
| 826 | VMM GDT | M-CS | M-DS | VMM PAGE TBL | MVPN-SW | LEGACY |

FIG. 5B

| SWITCHING FROM VMM TO HOST ||||||| 
|---|---|---|---|---|---|---|
| STEP | GDTR | CS | DS | CR3 | CODE VPN | MODE |
| 850 | VMM GDT | M-CS | M-DS | VMM PAGE TBL | MVPN-SW | LEGACY |
| 857 | VMM GDT | M-CS | M-DS | VMM PAGE TBL | PPN-SW | LEGACY |
| 858 | SWITCH GDT | M-CS | M-DS | VMM PAGE TBL | PPN-SW | LEGACY |
| 862 | SWITCH GDT | M-CS | M-DS | SWITCH PAGE TBL | PPN-SW | LEGACY |
| 866 | SWITCH GDT | M-CS | M-DS | SWITCH PAGE TBL | PPN-SW | LONG, COMP |
| 868 | SWITCH GDT | M-CS | S-DS | SWITCH PAGE TBL | PPN-SW | LONG, COMP |
| 870 | SWITCH GDT | CS-64 BIT | S-DS | SWITCH PAGE TBL | PPN-SW | LONG, 64-BIT |
| 872 | SWITCH GDT | CS-64 BIT | S-DS | SWITCH PAGE TBL | HVPN-SW | LONG, 64-BIT |
| 874 | HOST GDT | CS-64 BIT | S-DS | SWITCH PAGE TBL | HVPN-SW | LONG, 64-BIT |
| 876 | HOST GDT | CS-64 BIT | S-DS | HOST PAGE TBL | HVPN-SW | LONG, 64-BIT |
| 877 | HOST GDT | CS-64 BIT | H-DS | HOST PAGE TBL | HVPN-SW | LONG, 64-BIT |
| 880 | HOST GDT | H-CS | H-DS | HOST PAGE TBL | HVPN-SW | LONG, 64-BIT |

FIG. 6B

* # SWITCHING BETWEEN MULTIPLE SOFTWARE ENTITIES USING DIFFERENT OPERATING MODES OF A PROCESSOR

CLAIM OF PRIORITY

This application is a continuation of U.S. patent application Ser. No. 10/829,780, filed on Apr. 21, 2004, now U.S. Pat. No. 7,478,388, entitled "Switching Between Multiple Software Entities Using Different Operating Modes of a Processor in a Computer System."

BACKGROUND OF THE INVENTION

1. Field of the Invention

This invention relates to the field of system-level programming for a computer system in which a processor has multiple operating modes.

2. Description of the Related Art

Virtualization has brought many advantages to the world of computers. As is well known in the art, a virtual machine (VM) is a software abstraction—a "virtualization"—of an actual physical computer system that runs as a "guest" on an underlying "host" hardware platform. As long as a suitable interface is provided between the VM and the host platform, one advantage is that the operating system (OS) in the guest need not be the same as the OS at the system level in the host. For example, applications that presuppose a Microsoft Windows OS can be run in the VM even though the OS used to handle actual I/O, memory management, etc., on the host might be Linux.

It usually requires less than 10% of the processing capacity of a CPU to run a typical application, although usage may peak briefly for certain operations. Virtualization can more efficiently use processing capacity by allowing more than one VM to run on a single host, effectively multiplying the number of "computers" per "box." Depending on the implementation, the reduction in performance is negligible, or at least not enough to justify separate, dedicated hardware "boxes" for each user.

Still another advantage is that different VMs can be isolated from and completely transparent to one another. Indeed, the user of a single VM will normally be unaware that he is not using a "real" computer, that is, a system with hardware dedicated exclusively to his use. The existence of the underlying host will also be transparent to the VM software itself.

As individuals, companies, schools, governments and other organizations transition from 32-bit hardware platforms, 32-bit OSs and 32-bit applications toward 64-bit hardware platforms, 64-bit OSs and 64-bit applications, there will be a need and/or a desire to execute 32-bit OSs and/or 32-bit applications on a 64-bit hardware platform. The AMD and Intel architectures provide some capabilities for executing 32-bit OSs and/or 32-bit applications (as well as 16-bit OSs and 16-bit applications) on the 64-bit processors, using different operating modes. Specifically, the x86-64 architecture, for example, includes a long mode and a legacy mode. The long mode requires a 64-bit OS, while the legacy mode is used with 32-bit and 16-bit OSs, along with 32-bit and 16-bit applications. The long mode includes two sub-modes, namely a 64-bit mode and a compatibility mode. The 64-bit mode is used for executing 64-bit applications and the compatibility mode is used for executing 32-bit and 16-bit applications under a 64-bit OS. The 64-bit version of the Microsoft Windows XP™ OS and 64-bit versions of Linux currently provide support, or are developing support, for executing 32-bit applications and drivers in the compatibility mode of the x86-64 processor. When in the legacy mode, the processor operates substantially the same as an x86 processor, at least from the perspective of system software and applications, including a protected mode, a virtual-8086 mode and a real mode. The operating modes of the x86-64 architecture, along with many other aspects of the processor, are described in detail in the AMD64 Architecture Programmer's Manual ("the AMD64 Manual"). The 64-Bit Extension Technology Software Developer's Guide provides similar information for Intel's platform.

The capabilities provided by the x86-64 architecture for executing 32-bit OSs and 32-bit applications are limited, however. For example, the x86-64 architecture does not provide the capability of executing multiple OSs at the same time.

SUMMARY OF THE INVENTION

In one embodiment, a computer program embodied in a tangible medium is disclosed. The computer program is executable in a computer system. The computer system includes a new processor having a new operating mode and a legacy operating mode. The legacy operating mode is suitable for executing a legacy application and a legacy operating system (OS). The computer system further including a host OS that is executable on the new processor in the new operating mode. The computer program includes a virtualization software that is executable on the new processor in the legacy mode, the virtualization software supporting a virtual machine (VM) having a virtual legacy processor on which a legacy OS and a legacy application can run and a switch routine for switching between the host OS executing in the new operating mode and the virtualization software executing in the legacy operating mode. The new processor includes a legacy instruction set for the legacy operating mode and a new instruction set for the new operation mode. The switching includes switching from the new instruction set to the legacy instruction set and switching paging tables. Each of the new operating mode and the legacy operating mode has separate paging tables. The switch routine is incorporated in a switch page that is locked in physical memory. The switch page has a first section to store a part of switching instructions conforming to the new instruction set and a second section to store another part of the switching instructions conforming to the legacy instruction set.

In another embodiment, a method for switching from a second software entity executing in a legacy mode of an x86-64 processor to a first software entity executing in a 64-bit mode of the processor is disclosed. The first and second software entities both running at the same system level of the processor. The first software entity and the second software entity each executing with memory paging enabled. The first software entity using a first page table and the second software entity using a second page table The method including a) switching to fetch instructions from a switch page using a second identity mapping for the switch page, the second identity mapping being in the second page table, b) disabling memory paging, and c) activating a switch page table. The switch page table being different from the first and second page tables. The method further including d) enabling the long mode of the processor, e) enabling memory paging, which causes the processor to switch to the compatibility mode, f) switching to the 64-bit mode of the processor, g) activating the first page table, and h) loading a plurality of registers of the processor with values for the first software entity, to restore a context of the first software entity.

BRIEF DESCRIPTION OF THE DRAWINGS

FIG. 5B is a table indicating selected contents of the registers of the processor at different steps during the method of FIG. 5A in accordance with one or more embodiments of the present invention.

FIG. 6B is a table indicating selected contents of the registers of the processor at different steps during the method of FIG. 6A in accordance with one or more embodiments of the present invention.

DETAILED DESCRIPTION

Figure 1:
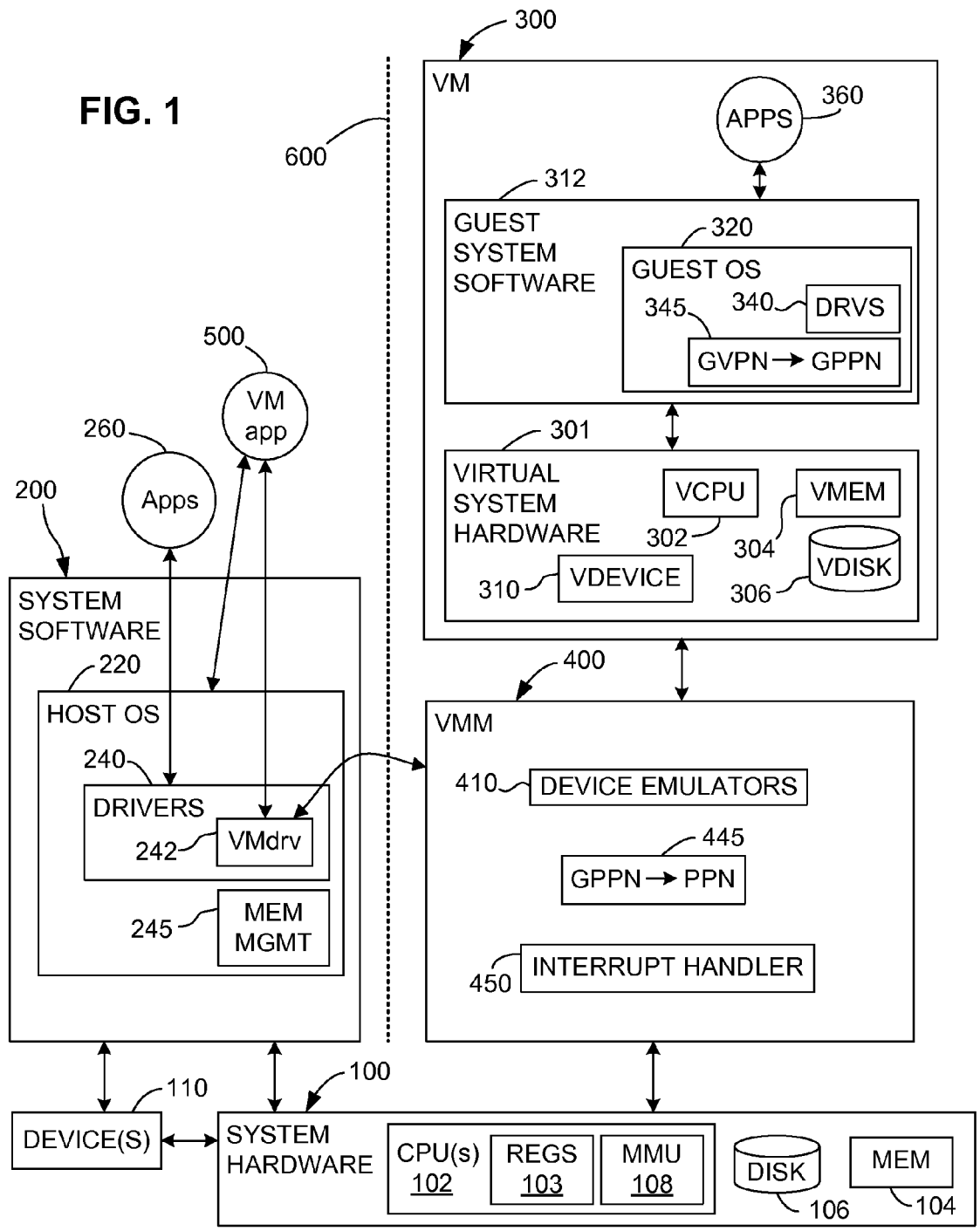
FIG. 1 illustrates a virtual computer system installed on a host platform, with a virtual machine monitor (VMM) at the same system level as the host operating system.

FIG. 1 illustrates the main components of an exemplary system that supports a virtual machine. As in conventional computer systems, both system hardware 100 and system software 200 are included. The system hardware 100 includes CPU(s) 102, which may be a single processor, or two or more cooperating processors in a known multiprocessor arrangement. In the case of the Workstation product, the CPU(s) 102 are based on the x86 architecture. The CPU(s) 102 include a set of registers 103 and a memory management unit (MMU) 108. The system hardware also includes system memory 104 and one or more disks 106. As is well understood in the field of computer engineering, the system hardware also includes, or is connected to, interrupt handling circuitry, a clock, etc., which, for the sake of simplicity, are not shown in the figure.

The system software 200 either is or at least includes an operating system (OS) 220, which has drivers 240 as needed for controlling and communicating with various devices 110, and usually with the disk 106 as well. In the case of the Workstation product, the OS 220 is a 32-bit OS, such as a 32-bit Windows OS from Microsoft Corporation or a 32-bit Linux distribution. Conventional applications 260, if included, may be installed to run on the hardware 100 via the system software 200 and any drivers needed to enable communication with devices.

As mentioned above, the virtual machine (VM) 300—also known as a "virtual computer"—is a software implementation of a complete computer system. In the VM, the physical system components of a "real" computer are emulated in software, that is, they are virtualized. Thus, the VM 300 will typically include virtualized ("guest") system hardware 301, which in turn includes one or more virtual CPUs 302 (VCPU), virtual system memory 304 (VMEM), one or more virtual disks 306 (VDISK), and one or more virtual devices 310 (VDEVICE), all of which are implemented in software to emulate the corresponding components of an actual computer. In the case of the Workstation product, the virtualized system hardware 301 is also based on the x86 platform, and the VCPU 302 is an x86 microprocessor.

The VM's system software 312 includes a guest operating system 320, which is a 32-bit guest OS in the case of the Workstation product. The guest OS 320 may, but need not, simply be a copy of a conventional, commodity OS. The system software 312 also includes drivers 340 (DRVS) as needed, for example, to control the virtual device(s) 310. Of course, most computers are intended to run various applications, and a VM is usually no exception. Consequently, by way of example, FIG. 1 illustrates one or more applications 360 installed to run on the guest OS 320; any number of applications, including none at all, may be loaded for running on the guest OS, limited only by the requirements of the VM.

Note that although the hardware "layer" 301 is a software abstraction of physical components, the VM's system software 312 may be the same as would be loaded into a hardware computer. The modifier "guest" is used here to indicate that the VM, although it acts as a "real" computer from the perspective of a user, is actually just computer code that is executed on the underlying "host" hardware and software platform 100, 200. Thus, for example, I/O to the virtual device 310 is actually carried out by I/O to the hardware device 110, but in a manner transparent to the VM.

Some interface is usually required between the VM 300 and the underlying "host" hardware 100, which is responsible for actually executing VM related instructions and transferring data to and from the actual, physical memory 104. One advantageous interface between the VM and the underlying host system is often referred to as a virtual machine monitor (VMM), also known as a virtual machine "manager." Virtual machine monitors have a long history, dating back to mainframe computer systems in the 1960s. See, for example, Robert P. Goldberg, "Survey of Virtual Machine Research," IEEE Computer, June 1974, p. 54-45.

A VMM is usually a relatively thin layer of software that runs directly on top of a host, such as the system software 200, or directly on the hardware, and virtualizes the resources of the (or some) hardware platform. The VMM will typically include at least one device emulator 410, which may also form the implementation of the virtual device 310. The interface exported to the respective VM is usually such that the guest OS 320 cannot determine the presence of the VMM. The VMM also usually tracks and either forwards (to the host OS 220) or itself schedules and handles all requests by its VM for machine resources, as well as various faults and interrupts. FIG. 1 therefore illustrates an interrupt (including fault) handler 450 within the VMM. The general features of VMMs are well known and are therefore not discussed in further detail here.

In FIG. 1, a single VMM 400 is shown acting as the interface for the single VM 300. It would also be possible to include the VMM as part of its respective VM, that is, in each virtual system. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention works with all such VM/VMM configurations.

In some virtual system configurations, the VMM 400 runs as a software layer between the host system software 200 and the VM 300. In other configurations, such as the one illustrated in FIG. 1, the VMM runs directly on the hardware platform 100 at the same system level as the host OS. In such case, the VMM may use the host OS to perform certain functions, including I/O, by calling (usually through a host API—application program interface) the host drivers 240. In this situation, it is still possible to view the VMM as an additional software layer inserted between the hardware 100 and the guest OS 320. Furthermore, it may in some cases be beneficial to deploy VMMs on top of a thin software layer, a "kernel," constructed specifically for this purpose.

Figure 2:
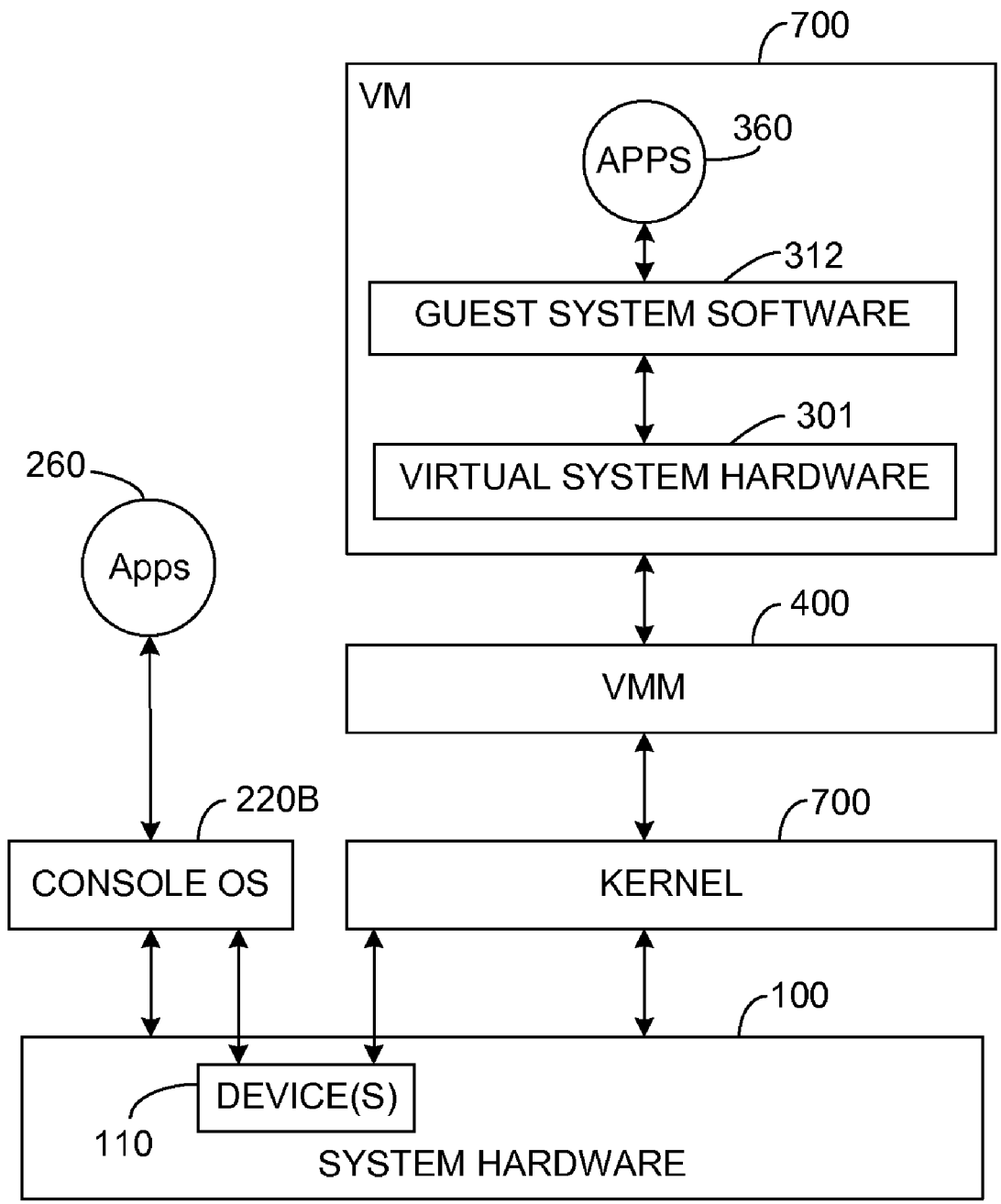
FIG. 2 illustrates an alternative configuration of a virtual computer system, which includes a kernel on which the VMM runs.

FIG. 2 illustrates yet another implementation, in which a kernel 700 takes the place of and performs the conventional functions of the host OS. The ESX Server product of VMware has this general structure. Compared with a system in which VMMs run directly on the hardware platform, use of a kernel offers greater modularity and facilitates provision of services that extend across multiple virtual machines (for example, resource management). Compared with the hosted deployment, a kernel may offer greater performance because it can be co-developed with the VMM and be optimized for the characteristics of a workload consisting of VMMs.

FIG. 2 also shows a console OS 220B and a set of one or more applications 260 running thereon. The console OS 220B may be used to initially boot-up the virtual computer system and to initiate the loading of the kernel 700. Once the kernel 700 is loaded, the kernel 700 may take over control of the virtual computer system and operate as the primary OS in the system. The console OS 220B may still be used, however, such as to support an application 260 that provides a user with access to configuration data of the kernel 700 and/or the VMM 400. Thus, a system administrator may use the application 260 to control the operating characteristics of the kernel 700 and/or the VMM 400. For example, the user may specify relative resource allocations for multiple virtual machines. The console OS 220B may also be used to provide interfaces for selected hardware devices 110, while the kernel 700 may interface directly with other hardware devices 110. For example, in the case of the ESX Server, the console OS 220B interfaces with some devices 110, such as a mouse and keyboard, while the kernel 700 interfaces directly with other devices 110, such as a Small Computer System Interface (SCSI) adapter connected to a disk drive. For the devices 110 that the kernel 700 controls, the kernel 700 replaces the corresponding interrupt routines in the console OS 220B with references to the appropriate routines within the kernel 700, so that an interrupt related to a device 110 that is serviced by the kernel 700 is routed to the kernel 700, instead of being handled by the console OS 220B. Context switching between the console OS 220B and the kernel 700 may be substantially the same as for the system of FIG. 1. Thus, this invention may also be used in the system of FIG. 2, to switch between the context of the console OS 220B and the context of the kernel 700.

As used herein, the "host" OS therefore means either the native OS 220 of the underlying physical computer, or whatever system-level software handles actual I/O operations, takes faults and interrupts, etc. for the VM. The invention may be used in all the different configurations described above.

In most modern computers, memory is addressed as units known as "pages," each of which is identified by a corresponding page number. The most straightforward way for all components in a computer to uniquely identify a memory page would be for them all simply to use a common set of page numbers. This is almost never done, however, for many well-known reasons. Instead, user-level software normally refers to memory pages using one set of identifiers, which is then ultimately mapped to the set actually used by the underlying hardware memory.

When a subsystem requests access to the hardware memory 104, for example, the request is usually issued with a "virtual address," since the memory space that the subsystem addresses is a construct adopted to allow for much greater generality and flexibility. The request must, however, ultimately be mapped to an address that is issued to the actual hardware memory. This mapping, or translation, is typically specified by the operating system (OS), which includes some form of memory management module 245 included for this purpose. The OS thus converts the "virtual" address (VA), in particular, the virtual page number (VPN) of the request, into a "physical" address (PA), in particular, a physical page number (PPN), that can be applied directly to the hardware. (The VA and PA have a common offset from a base address, so that only the VPN needs to be converted into a corresponding PPN.)

When writing a given word to a virtual address in memory, the processor breaks the virtual address into a virtual page number (higher-order address bits) plus an offset into that page (lower-order address bits). The virtual page number (VPN) is then translated using mappings established by the OS into a physical page number (PPN) based on a page table entry (PTE) for that VPN in the page table associated with the currently active address space. The page table will therefore generally include an entry for every VPN. The actual translation may be accomplished simply by replacing the VPN (the higher order bits of the virtual address) with its PPN mapping, leaving the lower order offset bits the same.

To speed up virtual-to-physical address translation, a hardware structure known as a translation look-aside buffer (TLB) is normally included, for example, as part of the hardware memory management unit (MMU) 108. The TLB contains, among other information, VPN-to-PPN mapping entries at least for VPNs that have been addressed recently or frequently. Rather than searching the entire page table, the TLB is searched first instead. If the current VPN is not found in the TLB, then a "TLB miss" occurs, and the page tables in memory are consulted to find the proper translation, and the TLB is updated to include this translation. After the TLB miss fault is handled, the same memory access is attempted again, and this time, the required VPN-to-PPN mapping is found in the TLB. The OS thus specifies the mapping, but the hardware MMU 108 usually actually performs the conversion of one type of page number to the other. Below, for the sake of simplicity, when it is stated that a software module "maps" page numbers, the existence and operation of a hardware device such as the MMU 108 may be assumed.

The concepts of VPNs and PPNs, as well as the way in which the different page numbering schemes are implemented and used, are described in many standard texts, such as "Computer Organization and Design: The Hardware/ Software Interface," by David A. Patterson and John L. Hennessy, Morgan Kaufmann Publishers, Inc., San Francisco, Calif., 1994, pp. 579-603 (chapter 7.4 "Virtual Memory"). Patterson and Hennessy analogize address translation to finding a book in a library. The VPN is the "title" of the book and the full card catalog is the page table. A catalog card is included for every book in the library and tells the searcher where the book can be found. The TLB is then the "scratch" paper on which the searcher writes down the locations of the specific books he has previously looked up.

An extra level of addressing indirection is typically implemented in virtualized systems in that a VPN issued by an application 360 in the VM 300 is remapped twice in order to determine which page of the hardware memory is intended. A mapping module 345 within the guest OS 320 translates the guest VPN (GVPN) into a corresponding guest PPN (GPPN) in the conventional manner. The guest OS therefore "believes" that it is directly addressing the actual hardware memory, but in fact it is not. Of course, a valid address to the actual hardware memory address must, however, ultimately be used.

An address mapping module 445 in the VMM 400 therefore takes the GPPN issued by the guest OS 320 and maps it to a hardware page number PPN that can be used to address the hardware memory. From the perspective of the guest OS, the GVPN and GPPN are virtual and physical page numbers just as they would be if the guest OS were the only OS in the system. From the perspective of the actual host OS, however, the GPPN is a page number in the virtual address space, that is, a VPN, which is then mapped into the physical memory space of the hardware memory as a PPN. Note that in some literature involving virtualized systems, GVPNs, GPPNs, VPNs and PPNs are sometimes referred to as "VPNs," "PPNs," "VPNs" and "MPNs," respectively, where "MPN" means "machine page number," that is, the page number used to address the hardware memory. The problem is, though, that "VPN" is then used to mean the virtual page number in both the guest and host contexts, and one must always be aware of the current context to avoid confusion. Regardless of notation, however, the intermediate GPPN→PPN mapping performed by the VMM is transparent to the guest system.

Speed is a critical issue in virtualization—a VM that perfectly emulates the functions of a given computer but that is too slow to perform needed tasks is obviously of little good to a user. Ideally, a VM should operate at the native speed of the underlying host system. In practice, even where only a single VM is installed on the host, it is impossible to run a VM at native speed, if for no other reason than that the instructions that define the VMM must also be executed. Near native speed, is possible, however, in many common applications.

The highest speed for a VM is found in the special case where every VM instruction executes directly on the hardware processor. This would in general not be a good idea, however, because the VM should not be allowed to operate at the greatest privilege level; otherwise, it might alter the instructions or data of the host OS or the VMM itself and cause unpredictable behavior. Moreover, in cross-architectural systems, one or more instructions issued by the VM may not be included in the instruction set of the host processor. Instructions that cannot (or must not) execute directly on the host are typically converted into an instruction stream that can. This conversion process is commonly known as "binary translation."

U.S. Pat. No. 6,397,242 (Devine, et al., "Virtualization system including a virtual machine monitor for a computer with a segmented architecture"), which is incorporated herein by reference, describes a system in which the VMM includes a mechanism that allows VM instructions to execute directly on the hardware platform whenever possible, but that switches to binary translation when necessary. This allows for the speed of direct execution combined with the security of binary translation.

A virtualization system of course involves more than executing VM instructions—the VMM itself is also a software mechanism defined by instructions and data of its own. For example, the VMM might be a program written in C, compiled to execute on the system hardware platform. At the same time, an application 360 written in a language such as Visual Basic might be running in the VM, whose guest OS may be compiled from a different language.

There must also be some way for the VM to access hardware devices, albeit in a manner transparent to the VM itself. One solution would of course be to include in the VMM all the required drivers and functionality normally found in the host OS 220 to accomplish I/O tasks. Two disadvantages of this solution are increased VMM complexity and duplicated effort—if a new device is added, then its driver would need to be loaded into both the host OS and the VMM. In systems that include a host OS (as opposed to a dedicated kernel such as shown in FIG. 2), a much more efficient method has been implemented in VMware's Workstation product. This method is also illustrated in FIG. 1.

In the system illustrated in FIG. 1, both the host OS and the VMM are installed at system level, meaning that they both run at the greatest privilege level and can therefore independently modify the state of the hardware processor(s). For I/O to at least some devices, however, the VMM may issue requests via the host OS 220. To make this possible, a special driver VMdrv 242 is installed as any other driver within the host OS 220 and exposes a standard API to a user-level application VMapp 500. When the system is in the VMM context, meaning that the VMM is taking exceptions, handling interrupts, etc., but the VMM wishes to use the existing I/O facilities of the host OS, the VMM calls the driver VMdrv 242, which then issues calls to the application VMapp 500, which then carries out the I/O request by calling the appropriate routine in the host OS.

In FIG. 1, the vertical line 600 symbolizes the boundary between the virtualized (VM/VMM) and non-virtualized (host software) "worlds" or "contexts." The driver VMdrv 242 and application VMapp 500 thus enable communication between the worlds even though the virtualized world is essentially transparent to the host system software 200.

The driver VMdrv 242 and the application VMapp 500 are also used when switching between the virtualized world and the non-virtualized world. This switching function is described in U.S. Pat. No. 6,496,847 (Bugnion, et al., "System and method for virtualizing computer systems") ("the '847 patent), which is incorporated herein by reference. As described in the '847 patent, switching between the two worlds involves a "total processor switch," including the saving and restoring of all the registers, segments, floating-point registers, and control registers of the processor.

When the system is in the host context, the host OS 220 schedules the applications 260, along with the application VMapp 500, for execution on the system hardware 100 in a conventional multitasking manner. When the application VMapp 500 is scheduled for execution, the application VMapp 500 calls to the driver VMdrv 242. The driver VMdrv 242 initiates the execution of a switch routine that stores the host context and switches over to the VMM context, restoring a previously stored VMM context. As described in the '847 patent, the switch routine executes from a cross page that begins at the same linear address in both the host context and the VMM context. The same function is also performed when switching between one virtualized world and another. Also, when the VMM is ready to relinquish control of the system back to the host context, the VMM calls the driver VMdrv 242, which again initiates the execution of the switch routine.

This time, the switch routine stores the VMM context and switches back to the host context, restoring the previously stored host context.

The invention may be implemented in a wide variety of computer systems involving multiple software entities executing on one or more processors in multiple different modes of operation. The invention comprises a method for switching from one software entity executing in a first operating mode to another software entity executing in a second operating mode. The invention also comprises a computer program executable in a computer system comprising a 64-bit physical processor and a 64-bit host OS, the computer program comprising a 32-bit VMM supporting a 32-bit VM, as described below. The invention may also be implemented in other virtual computer systems in which a VMM runs in a legacy mode of a processor and supports a legacy VM.

An illustrative embodiment is described in terms of a virtual computer system, such as the one illustrated in FIG. 1, in which the system hardware 100 is based on the x86-64 platform and the host OS 220 is a 64-bit OS, such as a 64-bit version of the Windows XP OS, a 64-bit version of a Linux distribution, or a 64-bit version of VMware's kernel, which is represented by the kernel 700 of FIG. 2. VMware's 32-bit Workstation product already has the general structure and functionality of the virtual computer system of FIG. 1. Thus, it would be advantageous to adapt the 32-bit Workstation product for use in a 64-bit hardware and software system. It would also be advantageous to make such an adaptation with relatively few changes to the 32-bit Workstation product.

In the 32-bit Workstation product, all of the software components in all three categories, including the VMM 400, the driver VMdrv 242 and the application VMapp 500, are designed and compiled for execution in a 32-bit environment. One object of this invention is to provide the same basic functionality as the 32-bit Workstation product in a 64-bit environment, with relatively little change to the 32-bit implementation. More specifically, the 64-bit environment may comprise an x86-64 CPU 102 and a 64-bit host OS 220.

The host OS 220 operates in long mode. The driver VMdrv 242, along with other components in the second category, will likely need to be modified and recompiled to work in the 64-bit OS. Applications running on the host OS 220, such as the applications 260, the application VMapp 500 and any other components in the first category, may be either 64-bit applications or 32-bit applications. The CPU 102 will operate in 64-bit mode when executing a 64-bit application, and it will operate in compatibility mode when executing a 32-bit application. To save the time and expense of a redesign, the application VMapp 500, along with any other components in the first category, preferably remain 32-bit applications, at least initially. Ultimately, however, the applications in the first category may be modified and recompiled to execute as 64-bit applications in 64-bit mode.

The VMM 400, including all components in the third category, preferably also remain as 32-bit software components initially. The components in the third category, including the 32-bit VMM 400, must be executed on the x86-64 CPU 102 in legacy mode. Thus, as part of this invention, when switching between the host context and the virtual context, the CPU 102 is preferably also switched between long mode and legacy mode. Thus, the switch routine, which is preferably a part of the driver VMdrv 242, is redesigned to change the operating mode of the CPU 102, in addition to saving one context and switching to another context. The operation of the switch routine is described below in connection with FIGS. 3, 4, 5A, 5B, 6A and 6B.

Thus, the 32-bit Workstation product can be adapted to work in the 64-bit environment described above by redesigning the driver VMdrv 242 and compiling it for the 64-bit environment, without making any changes to the VMM 400 or the application VMapp 500 or any other components in the first and third categories. The driver VMdrv 242 may also function substantially the same as in the 32-bit Workstation product, except as described below. Thus, besides the modifications needed to enable the driver VMdrv 242 to operate in the 64-bit OS and the 64-bit compilation, the only other modifications required of the driver VMdrv 242 are those required to implement the function of switching between the host context and the VMM context. The implementation of this switching function is described below. Thus, the invention provides a method for switching from the long/64-bit mode of the CPU 102 to the legacy mode and for switching control of the CPU 102 from the host OS 220 to the VMM 400, along with a method for switching from the legacy mode of the CPU 102 to the long mode and for switching control of the CPU 102 from the VMM 400 to the host OS 220.

Figure 3:
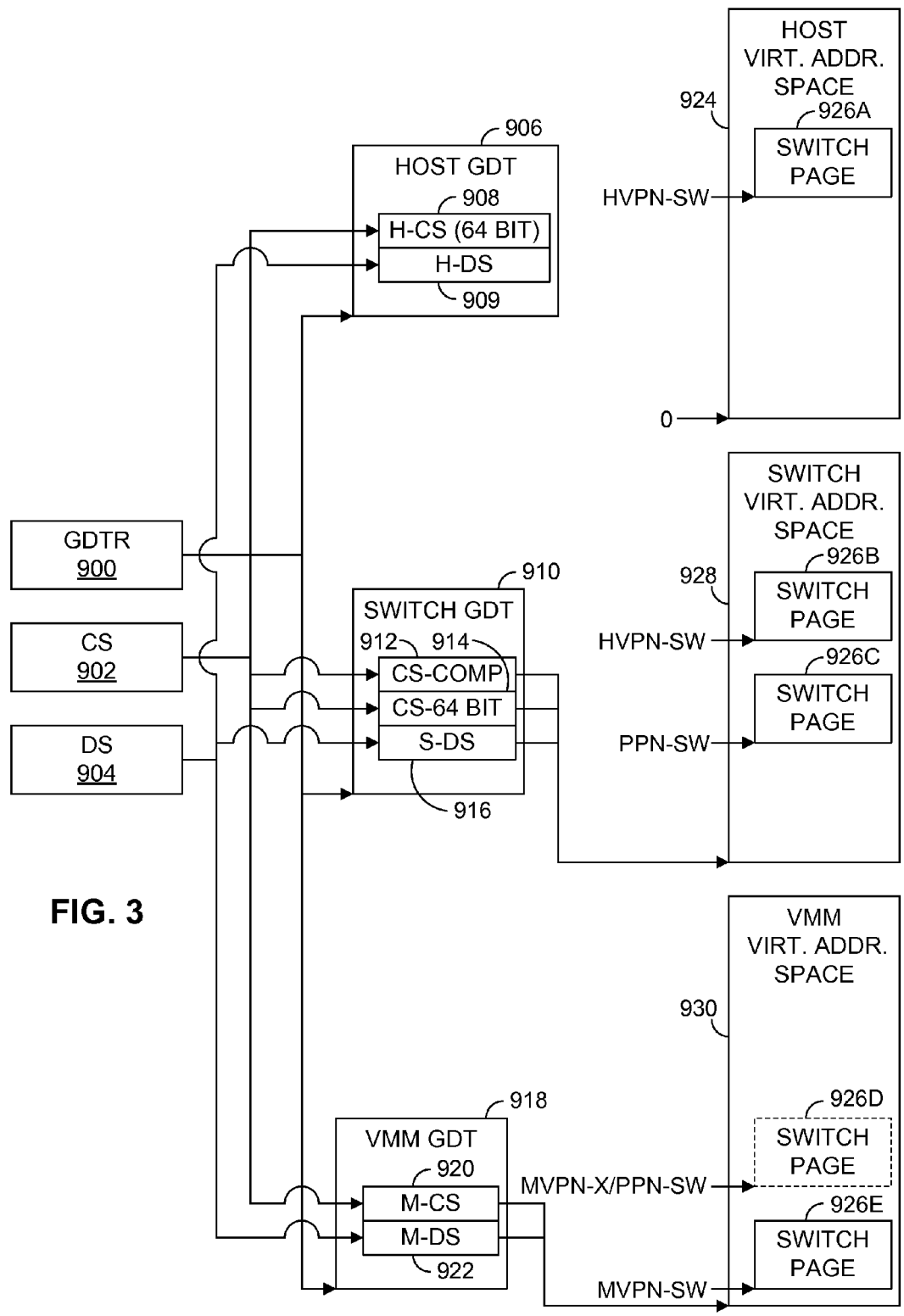
FIG. 3 illustrates the operation and use of segmented memory in the x86-64 architecture in accordance with one or more embodiments of the present invention.

FIG. 3 generally illustrates the virtual memory segmentation of the x86-64 processor, as used in this invention. FIG. 3 shows a Global Descriptor Table Register (GDTR) 900, a Code Segment register (CS register) 902 and a DS data segment register (DS register) 904. The structure, function and use of these registers are described in the AMD64 Manual.

Briefly, the GDTR 900 identifies a virtual memory location and size of an active Global Descriptor Table (GDT). A GDT contains segment descriptors, which contain information about one or more memory segments, such as their location in a virtual address space, their size and their protection characteristics. The CS register 902 and the DS register 904 each effectively contains an index into an active GDT (or an active local descriptor table (LDT)) to point to a segment descriptor, although the segment descriptors pointed to in the GDT (or LDT) are actually loaded into a software-invisible portion of the respective segment registers. The CS register 902 selects a segment descriptor that identifies a memory segment in which the code that is currently being executed is located. Thus, in fetching instructions to be executed, the CPU 102 uses the instruction pointer (IP) to form a virtual memory address, pointing into the memory segment selected by the CS register 902. Also, when the CPU 102 is in long mode, a bit of the CS register 902, referred to as the bit CS.L, is used to determine whether the code that is currently being executed is to be executed using the 64-bit mode or the compatibility mode, assuming no segment overrides. The DS register 904 selects a segment descriptor that identifies a data segment from which operands are retrieved or to which operands are written. Thus, virtual addresses that identify operands are used as pointers into a memory segment selected by the DS register 904. For simplification, suppose that the DS register 904 is used for identifying all operands, although other segment registers may also be used.

Suppose initially that the host context is active in the virtual computer system illustrated in FIG. 1. As shown in FIG. 3, the host OS 220 generates a host GDT 906 and loads the GDTR 900 so as to identify the host GDT 906. The identification of the GDT 906 is shown by a line from the GDTR 900 to a base address of the host GDT 906. Suppose further that the CPU 102 is operating in the long/64-bit mode. In the 64-bit mode, a flat memory model is used, so that code and data segments have a base address of zero and they have no limit, regardless of the contents of the CS register 902 or the DS register 904. As mentioned above, the CS.L bit in the CS register 902 determines whether the CPU 102 is in 64-bit mode or compatibility mode. Thus, the CS register 902 points to a segment descriptor 908 (H-CS for Host Code Segment) in the host GDT 906 that indicates that the 64-bit mode is to be used. Also, the DS register 904 points to a segment descriptor 909 (H-DS for Host Data Segment) in the host GDT 906. A host virtual address space 924 is shown in the upper-right portion of FIG. 3, which is the virtual (or linear) address space of the host OS 220. Because the host OS 220 operates in the 64-bit mode, the host virtual address space 924 has a base address of zero and a maximal limit.

Figure 4:
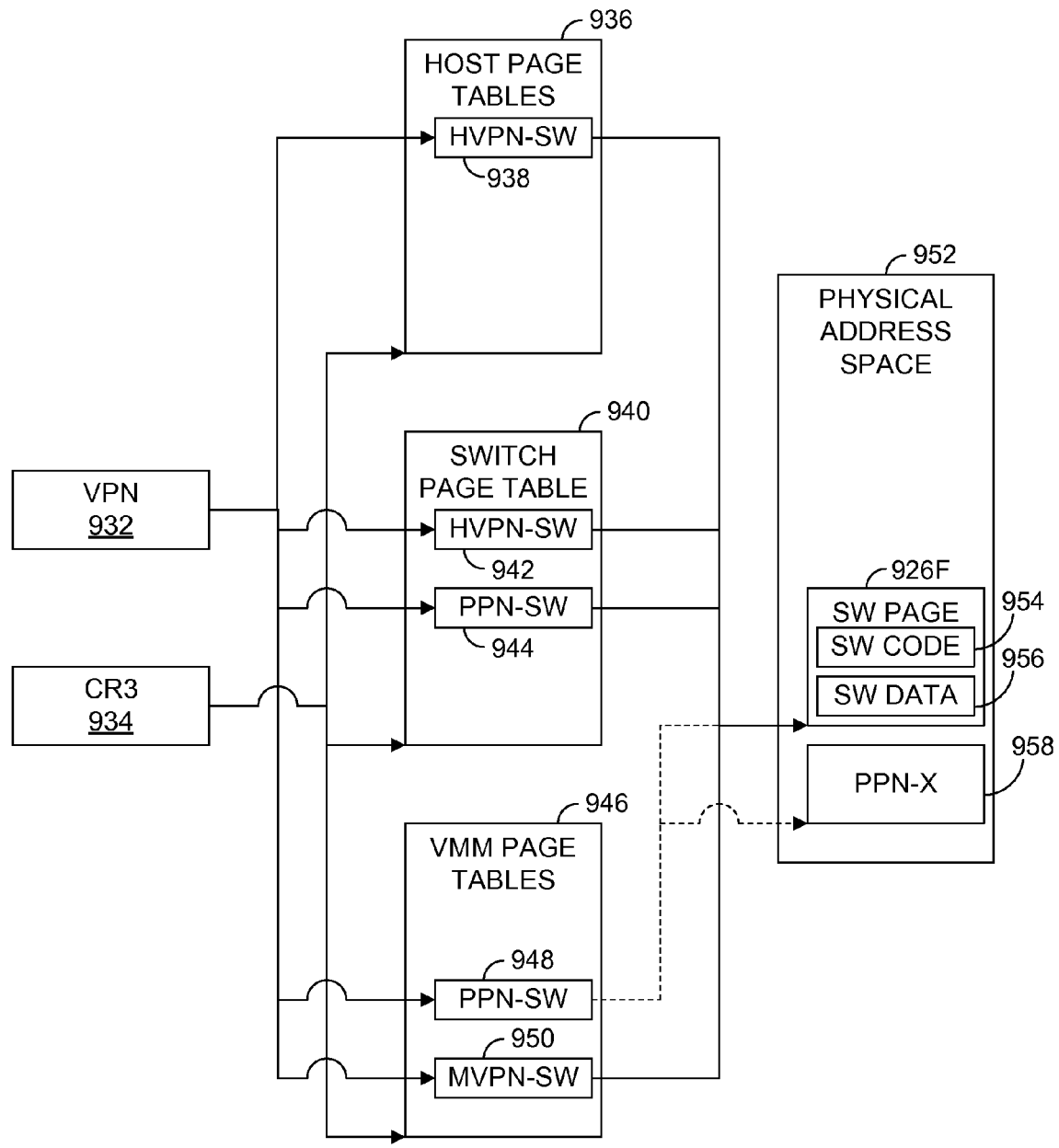
FIG. 4 illustrates the operation and use of the memory paging system of the x86-64 architecture in accordance with one or more embodiments of the present invention.

FIG. 4 generally illustrates the memory paging system of the x86-64 processor, as used in this invention. Sometimes, however, the memory paging system is disabled, and virtual addresses are used directly as physical addresses. The memory paging system of the x86-64 processor is also described in the AMD64 Manual. FIG. 4 shows a virtual page number (VPN) 932 and a CR3 control register 934. The VPN 932 does not represent a register or other storage location. Instead the VPN 932 represents whatever virtual page numbers are generated during the execution of instructions. The virtual address can identify either an instruction to be retrieved from memory for execution or a data value to be retrieved from memory or written to memory. The generation of virtual addresses (or linear addresses) is described in detail in the AMD64 Manual. The CR3 register 934 is a standard control register in the x86-64 architecture, and is described in detail in the AMD64 Manual. In particular, the CR3 register 934 contains a pointer to a physical base address for an active page table structure. The particular type of page table structure to which the CR3 register points depends on the operating mode of the CPU 102. The different page table structures are also described in detail in the AMD64 Manual.

Again, suppose that the host context is active in the virtual computer system illustrated in FIG. 1. As shown in FIG. 4, the host OS 220 generates a set of host page tables 936. The host page tables 936 have the structure of page-map level-4 (PML4) page tables, as described in the AMD64 Manual. The host OS 220 also loads the CR3 register 934 to point to the PML4 base address of the host page tables 936, as shown in FIG. 4 by a line from the CR3 register 934 to the base of the host page tables 936. The VPNs 932 generated while the virtual computer system is in the host context will be in the host virtual address space 924 illustrated in FIG. 3. A plurality of page table entries (PTEs) in the host page tables 936 map VPNs 932 into physical page numbers in a physical address space 952, shown in FIG. 4.

Figure 5A:
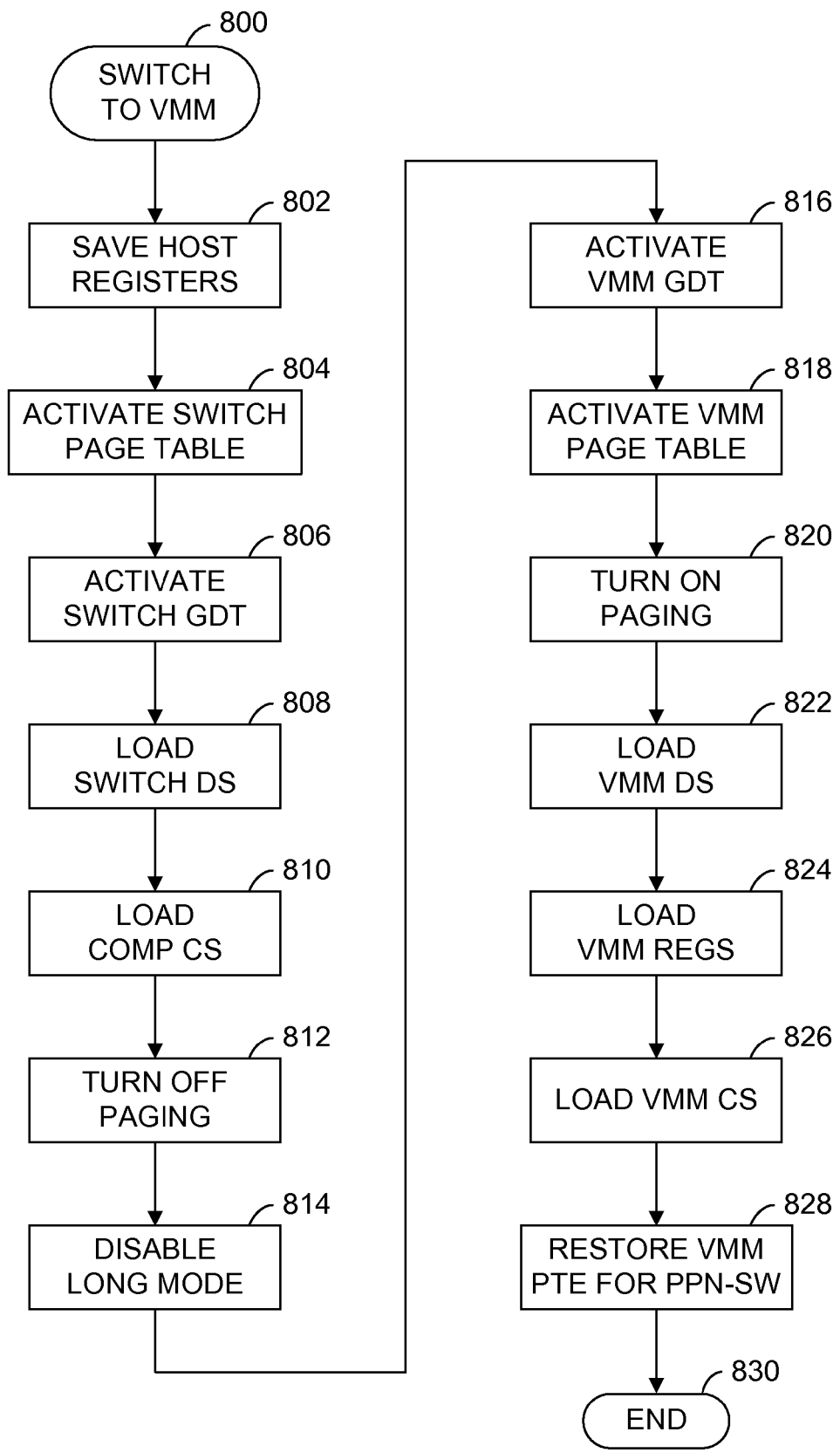
FIG. 5A is a flow chart illustrating a method for switching control of a processor from a 64-bit host operating system to a 32-bit VMM in accordance with one or more embodiments of the present invention.

Reference is now made to FIGS. 5A and 5B. FIG. 5A is a flow chart illustrating a method according to the invention for switching from the host context to the virtual context, including switching the CPU 102 from the long/64-bit mode to the legacy mode. FIG. 5B is a table indicating selected contents of the registers of the CPU 102 at different steps during the method of FIG. 5A.

Figure 6A:
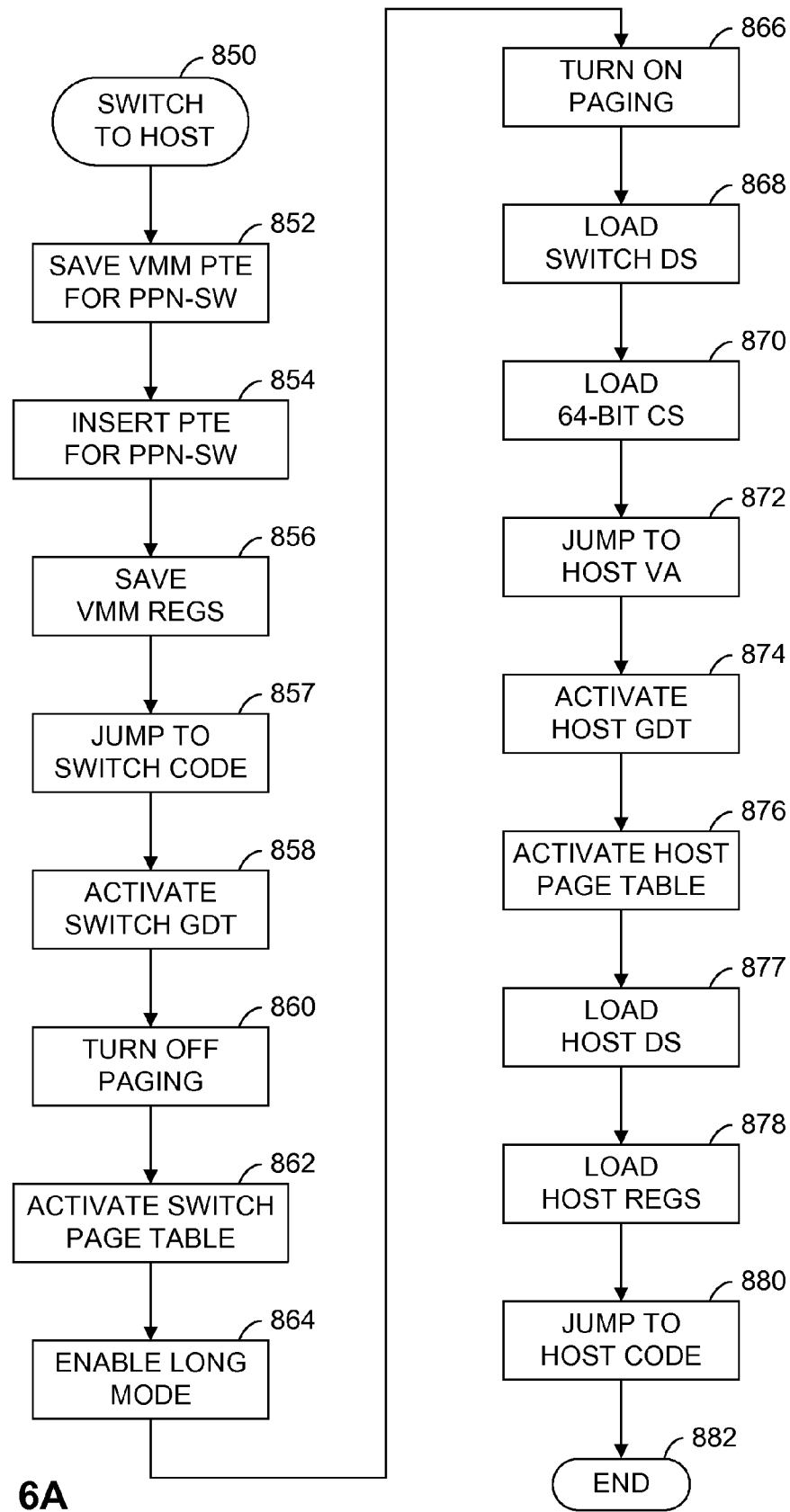
FIG. 6A is a flow chart illustrating a method for switching control of a processor from a 32-bit VMM to a 64-bit host operating system in accordance with one or more embodiments of the present invention.

Suppose, again, that the virtual computer system is operating in the host context, and the host OS 220 schedules the application VMapp 500 for execution, which initiates the switch from the host context to the virtual context. Next, the application VMapp 500 calls the driver VMdrv 242, which initiates a switch routine. The switch routine comprises a segment of code that is stored in a switch page 926F in physical memory, as shown in FIG. 4. The physical memory page in which the switch code is stored is preferably locked in physical memory, so that the physical memory page cannot be paged out or unmapped, as a result of the driver VMdrv 242 requesting a locked memory page from the host OS 220. The switch page 926F contains a switch code section 954 and a switch data section 956. The switch code 954 includes instructions that are executed during the method of FIG. 5A for switching from the host context to the virtual or VMM context, and the switch data 956 includes data that is used during the method of FIG. 5A. Also, the switch code 954 includes instructions that are executed during a method of FIG. 6A for switching from the VMM context to the host context, and the switch data 956 includes data that is used during the method of FIG. 6A. In one embodiment, all of the code and all of the data required for the methods of FIGS. 5A and 6A are contained in the switch code 954 and the switch data 956, respectively, of the switch page 926F. Also, in one such embodiment, the switch page 926F is a four-kilobyte (KB) physical memory page. In other embodiments, some of the code and/or some of the data required for the methods of FIGS. 5A and 6A are contained in the driver VMdrv 242 and/or the VMM 400, and not in the switch code 954 or the switch data 956 of the switch page 926F. In still another embodiment, two physical memory pages may be used, with the switch code 954 on one page and the switch data 956 on the other.

When the driver VMdrv 242 begins executing, it is executing within the host virtual address space 924, as the CR3 register 934 points to the base of the host page tables 936. Thus, to access the switch routine contained in the switch code 954, the host page tables 936 contain a mapping or page table entry (PTE) 938 that maps from a host virtual page number (HVPN) within the host virtual address space 924 to the switch page 926F, as shown in FIG. 4. The VPN 932 in the host virtual address space 924 that maps to the switch page 926F is referred to as the HVPN-SW (for Host Virtual Page Number that maps to the SWitch page 926F). Thus, as shown in FIG. 4, the VPN 932 may be the HVPN-SW, which points to the PTE 938 in the host page tables 936. The PTE 938 provides a translation from the virtual page number HVPN-SW to the physical page number of the switch page 926F. Thus, the switch page 926F is mapped into the host virtual address space 924 at the virtual page number HVPN-SW, which is shown in FIG. 3 as a switch page mapping 926A.

Once the switch routine is initiated from the host context, the method of FIG. 5A begins at an initial step 800. The third row of the table of FIG. 5B (going from top to bottom) shows the general status of the CPU 102 at this point. Thus, at the step 800 (see the first column going from left to right) the GDTR 900 points to the host GDT 906 (see the second column); the CS register 902 points to (and contains) the host code segment descriptor (H-CS) 908 (see the third column), which indicates the 64-bit mode; the DS register 904 points to (and contains) the host data segment descriptor (H-DS) 909 (see the fourth column); the CR3 register 934 points to the base of the host page tables 936 (see the fifth column); and the mode of the CPU 102 is the long/64-bit mode (see the seventh column). Also at this point, the VPN 932 used for fetching instructions (the CODE VPN) is the virtual page number HVPN-SW (see the sixth column). The virtual page number HVPN-SW is also used for data references at this point.

As the switch code 954 begins execution, the method of FIG. 5A proceeds to a step 802. At the step 802, the switch code 954 saves the host context by saving all of the registers of the CPU 102, which, as described in the '847 patent, depends on the given computer hardware. For the x86 architecture on which the 32-bit Workstation product is based, the state that is saved includes: 1) the exception flags register; 2) general purpose registers; 3) segment registers; 4) the instruction pointer (EIP) register; 5) the local descriptor table register; 6) the task register; 7) debug registers; 8) control registers; 9) the interrupt descriptor table register; 10) the global descriptor table register; and 11) the floating point state. For the x86-64 architecture, additional information is saved. In particular, when saving either the host or the VMM context, many of the registers that are common to the x86 architecture are saved in their extended, 64-bit format, including the control registers CR0, CR2, CR3 and CR4, and the debug registers. In addition, when saving the host context, the 64-bit FS.base and GS.base segment registers are saved, while, when saving the VMM context, only the 32-bit FS and GS segment registers are saved. The FS.base and GS.base registers are mapped to Model-Specific Registers (MSRs). Accordingly, as described in the AMD64 Manual, the RDMSR instruction is used to read the registers when saving their contents, and the WRMSR instruction is used to write the registers when restoring their contents. Also, when restoring the host context, the 32-bit FS and GS registers are restored before the 64-bit FS.base and GS.base registers.

Next, at a step 804, the switch code 954 loads the CR3 register 934 with a value that points to the base of a switch page table 940, to activate the switch page table 940. The switch page table 940, which is illustrated in FIG. 4, is a PML4 page table that is created especially for use by the switch code 954. The switch page table 940 only needs to contain two mappings, specifically, a first PTE 942 mapping the virtual page number HVPN-SW from the host virtual address space 924 to the switch page 926F and a second PTE 944 that contains an "identity" mapping. The physical page number of the switch page 926F is referred to as PPN-SW. Thus, the PTE 944 maps the virtual page number that is equal to PPN-SW to the physical page number PPN-SW. The PTEs 942 and 944 are shown in FIG. 4 mapping the virtual page numbers HVPN-SW and PPN-SW, respectively, to the physical page number PPN-SW. After the switch page table 940 is activated at the step 804, code and data references may be made using either the host virtual address for the switch page 926F or the physical address of the switch page 926F, as they both map to the physical address of the switch page 926F. The fourth row of the table in FIG. 5B shows the status of the registers of the CPU 102 after the step 804 (see the first column). The only change that shows up in the table of FIG. 5B is that the CR3 register 934 now points to the switch page table 940, instead of the host page tables 936 (see the fifth column).

Next, at a step 806, the switch code 954 loads the GDTR 900 with a value that points to a switch GDT 910, to activate the switch GDT 910. The switch GDT 910, which is illustrated in FIG. 3, is also created especially for use by the switch code 954. The switch GDT 910 is preferably also contained within the switch page 926F, and it contains three segment descriptors. First, a CS-COMP (for Code Segment-COMPatibility mode) segment descriptor 912 identifies a code segment that executes in long/compatibility mode, and that has a base address of zero and a 4 GB limit. Second, a CS-64 BIT (for Code Segment-64-BIT mode) segment descriptor 914 identifies a code segment that executes in long/64-bit mode. Third, an S-DS (for Switch Data Segment) segment descriptor 916 identifies a data segment that has a base address of zero and a 4 GB limit. Thus, a switch virtual address space 928 is defined, with each of the segment descriptors 912, 914 and 916 providing a base address of zero, as shown in FIG. 3. FIG. 3 also shows a switch page mapping 926B at the virtual page number HVPN-SW in the switch virtual address space 928, as provided by the PTE 942, and a switch page mapping 926C at the virtual page number PPN-SW in the switch virtual address space 928, as provided by the PTE 944. The fifth row of the table in FIG. 5B shows the status of the registers of the CPU 102 after the step 806 (see the first column). The only change that shows up in the table of FIG. 5B is that the GDTR 900 now points to the switch GDT 910, instead of the host GDT 906 (see the second column).

Next, at a step 808, the switch code 954 loads the DS register 904 with a value that points to the S-DS segment descriptor 916 in the switch GDT 910, which causes the S-DS segment descriptor 916 to be loaded into a software-invisible portion of the DS register 904. The sixth row of the table in FIG. 5B shows the status of the registers of the CPU 102 after the step 808 (see the first column). The only change that shows up in the table of FIG. 5B is that the DS register 904 now points to (and contains) the S-DS segment descriptor 916 (see the fourth column).

Next, at a step 810, the switch code 954 performs a far jump instruction to the next sequential instruction in the switch page 926F, but using the virtual page number PPN-SW. Thus, if the IP is viewed in a simplified manner as containing a VPN and an offset, the VPN is changed from the virtual page number HVPN-SW to the virtual page number PPN-SW, and the offset is incremented to point to the next instruction, as if no jump had occurred. The instructions in the switch page 926F are executed sequentially because the virtual page numbers HVPN-SW and PPN-SW both map to the same physical page number PPN-SW. The far jump instruction also causes the CS register 902 to be loaded with a value that points to the CS-COMP segment descriptor 912, which causes the CS-COMP segment descriptor 912 to be loaded into a software-invisible portion of the CS register 902. As a result, the CPU 102 switches from the long/64-bit mode to the long/compatibility mode. The seventh row of the table in FIG. 5B shows the status of the registers of the CPU 102 after the step 810 (see the first column). After the step 810, the CS register 902 now points to (and contains) the CS-COMP segment descriptor 912 (see the third column), the CPU 102 is now operating in the long/compatibility mode (see the seventh column), and the switch code 954 will now use identity mapping (i.e. a VPN 932 that is equal to the virtual page number PPN-SW) for code references (see the sixth column). At this point, the CPU 102 is executing 32-bit x86 code in compatibility mode. The 32-bit code directly follows the previously executed 64-bit code in physical memory in the switch page 926F.

Next, at a step 812, the switch code 954 turns off memory paging by writing a zero to a paging enable bit of a CR0 control register (CR0.PG). As described in the AMD64 Manual, this step must be performed before disabling long mode, when switching from the long mode to the legacy mode of the x86-64 processor. Using identity mapped PTEs, such as the PTE 944, allow for the sequential execution of the instructions in the switch code 954 during the transition from having paging enabled to having paging disabled, and then, later, for a transition back to having paging enabled again. When paging is disabled, the CPU 102 automatically switches from the long mode to the legacy mode. Thus, the eighth row of the table in FIG. 5B shows that, after the step 812 (see the first column), the CPU 102 is operating in the legacy mode (see the seventh column). Also, as shown in the sixth column of the eighth row, instruction fetches are still specified using the virtual page number PPN-SW. Thus, the physical memory page in which the switch page 926F is stored must be such that the virtual page number PPN-SW is within the legacy virtual address space. For example, the switch page 926F must be within the lowest 4 GB of physical memory.

Next, at a step 814, the switch code 954 disables the long mode of the CPU 102 by writing a zero to a Long Mode Enable bit of an Extended Feature Enable Register (EFER-.LME). Next, at a step 816, the switch code 954 loads the GDTR 900 with a value that points to a VMM GDT 918, to activate the VMM GDT 918. The VMM GDT 918, which is illustrated in FIG. 3, is created by the VMM 400 for use when the virtual computer system is in the VMM context. The VMM GDT 918 contains at least two segment descriptors. First, an M-CS (for Monitor Code Segment, "monitor" being short for virtual machine monitor) segment descriptor 920 identifies a code segment that has a base address of zero and a 4 GB limit. Second, an M-DS (for Monitor Data Segment) segment descriptor 922 identifies a data segment that has a base address of zero and a 4 GB limit. Thus, a VMM virtual address space 930 is defined, with each of the segment descriptors 920 and 922 providing a base address of zero, as shown in FIG. 3. The ninth row of the table in FIG. 5B shows that, after the step 816 (see the first column), the GDTR 900 points to the VMM GDT 918 (see the second column).

Next, at a step 818, the switch code 954 loads the CR3 register 934 with a value that points to the base of a set of VMM page tables 946, to activate the VMM page tables 946. The VMM page tables 946, which are illustrated in FIG. 4, are a set of legacy x86 page tables that are for the use of the VMM 400. The VMM page tables 946 may contain a large number of PTEs, only two of which are shown in FIG. 4. First, the VMM page tables 946 contain a PTE 948 that maps the VPN 932 whose value is numerically equal to the PPN-SW. The contents of this PTE 948 are modified at a step 828 in this method of FIG. 5A and at a step 854 in the method of FIG. 6A. The PTE 948 is initially established by the application VMapp 500, for the VMM 400, and the VMM 400 may change the mapping of the PTE 948 from time to time. At a step 852 of the method of FIG. 6A, during a context switch from the VMM to the host, the mapping in the PTE 948, which was established by the VMM 400, is saved. Then, at the step 854 of the method of FIG. 6A, the PTE 948 is written with an identity mapping, mapping the virtual page number PPN-SW to the physical page number PPN-SW. Later, at the step 828 of this method of FIG. 5A, the mapping that was established by the VMM 400 and that was saved at the step 852 of the method of FIG. 6A is restored to the PTE 948. Thus, in general terms, the PTE 948 contains a mapping that is established by the VMM 400 while the VMM 400 is executing, and the PTE 948 contains an identity mapping when the switch code 954 is executing. At this step 818, the PTE 948 contains the identity mapping. The VMM page tables 946 also contain a PTE 950 that contains a mapping from a VPN 932 in the VMM virtual address space 930 to the switch page 926F. The VPN 932 in the VMM virtual address space 930 that maps to the switch page 926F is referred to as an MVPN-SW (for Monitor Virtual Page Number that maps to the SWitch page).

The PTEs 948 and 950 are shown in FIG. 4 mapping the virtual page numbers PPN-SW and MVPN-SW, respectively, to the physical page number PPN-SW. The line from the PTE 948 to the switch page 926F is shown as a dashed line because this mapping is not always loaded in the PTE 948. Instead, as described above, the PTE 948 sometimes contains a different mapping to some other physical memory page, which may vary from time to time, or to no physical memory page, as established by the VMM 400. For simplicity, suppose that the mapping established by the VMM 400 for the PTE 948 remains constant, mapping to a single physical memory page. Thus, another dashed line goes from the PTE 948 to another physical memory page 958 that is labeled as having a physical page number of PPN-X.

FIG. 3 shows a switch page mapping 926D at the virtual page number PPN-SW in the VMM virtual address space 930, as sometimes provided by the PTE 948, and a switch page mapping 926E at the virtual page number MVPN-SW in the VMM virtual address space 930, as provided by the PTE 950. The switch page mapping 926D is shown with a dashed line because the switch page mapping only appears at the virtual page number PPN-SW when the PTE 948 contains the identity mapping. Otherwise, the VMM virtual address space 930 contains a mapping of the physical page 958 at the virtual page number PPN-SW. The tenth row of the table in FIG. 5B shows that, after the step 818 (see the first column), the CR3 register 934 now points to the VMM page tables 946, instead of the switch page table 940 (see the fifth column).

Next, at a step 820, the switch code 954 turns on memory paging by writing a one to CR0.PG. Next, at a step 822, the switch code 954 loads the DS register 904 with a value that points to the M-DS segment descriptor 922 in the VMM GDT 918, which causes the M-DS segment descriptor 922 to be loaded into a software-invisible portion of the DS register 904. The eleventh row of the table in FIG. 5B shows that, after the step 822 (see the first column), the DS register 904 now points to (and contains) the M-DS segment descriptor 922 (see the fourth column).

Next, at a step 824, the switch code 954 restores the VMM context by restoring all of the registers of the CPU 102, as described in the '847 patent and in connection with the step 802 above. Next, at a step 826, the switch code 954 executes an instruction that loads a new value into the IP and causes the CS register 902 to be loaded with a value that points to the M-CS segment descriptor 920. The twelfth row of the table in FIG. 5B shows that, after the step 826 (see the first column), the CS register 902 now points to (and contains) the M-CS segment descriptor 920 (see the third column), and the switch code 954 will now use the virtual page number MVPN-SW for code references (see the sixth column).

Next, at the step 828, as described above, the switch code 954 replaces the contents of the PTE 948 with a mapping that was saved at the step 852 of the method of FIG. 6A. For the first switch from the host context to the VMM context, however, the method of FIG. 6A, and consequently the step 852, has not yet been performed. Nonetheless, the switch code 954 replaces the contents of the PTE 948 with an appropriate mapping, which is provided by the application VMapp 500. The restored mapping in the PTE 948 will be from the virtual page number PPN-SW to the physical page number PPN-X, using the above example. The method of FIG. 5A terminates at a step 830. The virtual computer system is now in the VMM context and the legacy operating mode, and the VMM 400 can now begin executing.

At some point, the VMM 400 will relinquish control of the CPU 102 and return control of the virtual computer system back to the host OS 220. The VMM 400 calls a different portion of the switch routine that performs a context switch from the virtual context to the host context, along with switching the CPU 102 from the legacy mode to the long/64-bit mode. The second portion of the switch routine may also be contained in the switch code 954, which is stored in the switch page 926F. The second portion of the switch routine may also use data from the switch data section 956, which may also be stored in the switch page 926F. Before the VMM 400 calls the switch code 954, the VMM 400 performs a few steps of the method of FIG. 6A, as described below.

FIG. 6A is a flow chart illustrating a method according to the invention for switching from the virtual context to the host context, including switching the CPU 102 from the legacy mode to the long/64-bit mode. This method is performed partly by the VMM 400 and partly by the switch code 954. FIG. 6B is a table indicating selected contents of the registers of the CPU 102 at different steps during the method of FIG. 6A.

The method of FIG. 6A begins at an initial step 850. The third row of the table of FIG. 6B (going from top to bottom) shows the general status of the CPU 102 at this point. Thus, at the step 850 (see the first column going from left to right) the GDTR 900 points to the VMM GDT 918 (see the second column); the CS register 902 points to (and contains) the M-CS segment descriptor 920 (see the third column); the DS register 904 points to (and contains) the M-DS segment descriptor 922 (see the fourth column); the CR3 register 934 points to the base of the VMM page tables 946 (see the fifth column); the VPN 932 used for fetching instructions (the CODE VPN) is the MVPN-SW (see the sixth column); and the operating mode of the CPU 102 is the legacy mode (see the seventh column). The virtual page number MVPN-SW is also used for data references at this point.

Next, the method of FIG. 6A proceeds to the step 852. At the step 852, as described above, the VMM 400 saves whatever mapping is in the PTE 948, which provides a mapping for the virtual page number PPN-SW. Next, at the step 854, the VMM 400 inserts the identity mapping into the PTE 948, as described above. Next, at a step 856, the VMM 400 saves the virtual context by saving all of the registers of the CPU 102, as described in the '847 patent and in connection with the step 802 of FIG. 5A above. Next, at a step 857, the VMM 400 calls the switch code 954 by performing a jump instruction to the switch page 926F. The fourth row of the table in FIG. 6B shows that, after the step 857 (see the first column), the switch code 954 will now use identity mapping (i.e. a VPN 932 that is equal to the virtual page number PPN-SW) for code references (see the sixth column). As an alternative, the order of the steps 856 and 857 may be reversed, so that the virtual context is saved by the switch code 954, after jumping to the switch page 926F.

Next, at a step 858, the switch code 954 loads the GDTR 900 with a value that points to the switch GDT 910, to activate the switch GDT 910. The fifth row of the table in FIG. 6B shows that, after the step 858 (see the first column), the GDTR 900 now points to the switch GDT 910, instead of the VMM GDT 918 (see the second column). Next, at a step 860, the switch code 954 turns off memory paging by writing a zero to CR0.PG. As described in the AMD64 Manual, this step must also be performed before enabling long mode, when switching from the legacy mode to the long mode of the x86-64 processor.

Next, at a step 862, the switch code 954 loads the CR3 register 934 with a value that points to the base of the switch page table 940, to activate the switch page table 940. The sixth row of the table in FIG. 6B shows that, after the step 862 (see the first column), the CR3 register 934 now points to the switch page table 940, instead of the VMM page tables 946 (see the fifth column). Next, at a step 864, the switch code 954 enables the long mode of the CPU 102 by writing a one to EFER.LME.

The AMD64 Manual indicates that, to use long mode, physical address extensions must be enabled by writing a one to a Physical Address Extension bit of a CR4 control register (CR4.PAE), before enabling memory paging. In the preferred embodiment, physical address extensions are always enabled because the VMM 400 runs with them enabled. The VMM 400 can still support guest OSs 320 that do not enable physical address extensions in the VM 300, however, without disabling physical address extensions in the CPU 102. Next, at a step 866, the switch code 954 turns on memory paging by writing a one to CR0.PG. When paging is enabled again, the CPU 102 automatically switches from the legacy mode to the long/compatibility mode. Thus, the seventh row of the table in FIG. 6B shows that, after the step 866 (see the first column), the CPU 102 is operating in the long/compatibility mode (see the seventh column).

Next, at a step 868, the switch code 954 loads the DS register 904 with a value that points to the S-DS segment descriptor 916 in the switch GDT 910, which causes the S-DS segment descriptor 916 to be loaded into a software-invisible portion of the DS register 904. The eighth row of the table in FIG. 6B shows that, after the step 868 (see the first column), the DS register 904 now points to (and contains) the S-DS segment descriptor 916 (see the fourth column). Next, at a step 870, the switch code 954 performs a far jump instruction that causes the CS register 902 to be loaded with a value that points to the CS-64 BIT segment descriptor 914, which causes the CS-64 BIT segment descriptor 914 to be loaded into a software-invisible portion of the CS register 902. As a result, the CPU 102 switches from the long/compatibility mode to the long/64-bit mode. The ninth row of the table in FIG. 6B shows that, after the step 870 (see the first column), the CS register 902 now points to (and contains) the CS-64 BIT segment descriptor 914 (see the third column), and the CPU 102 is now operating in the long/64-bit mode (see the seventh column).

Next, at a step 872, the switch code 954 jumps to an address in the host virtual address space 924, within the virtual page number HVPN-SW. Using the PTE 942 within the switch page table 940, the virtual page number HVPN-SW still maps to the switch page 926F. The tenth row of the table in FIG. 6B shows that, after the step 872 (see the first column), the switch code 954 will now use the virtual page number HVPN-SW for code references (see the sixth column). Next, at a step 874, the switch code 954 loads the GDTR 900 with a value that points to the host GDT 906, to activate the host GDT 906. The eleventh row of the table in FIG. 6B shows that, after the step 874 (see the first column), the GDTR 900 points to the host GDT 906 (see the second column).

Next, at a step 876, the switch code 954 loads the CR3 register 934 with a value that points to the base of the host page tables 936, to activate the host page tables 936. The switch code 954 continues fetching instructions using virtual addresses in the virtual page number HVPN-SW, using the PTE 938 to map to the switch code 954. The twelfth row of the table in FIG. 6B shows that, after the step 876 (see the first column), the CR3 register 934 now points to the host page tables 936, instead of the switch page table 940 (see the fifth column).

Next, at a step 877, the switch code 954 loads the DS register 904 with a value that points to the H-DS segment descriptor 909 in the host GDT 906, which causes the H-DS segment descriptor 909 to be loaded into a software-invisible portion of the DS register 904. The thirteenth row of the table in FIG. 6B shows that, after the step 877 (see the first column), the DS register 904 now points to (and contains) the H-DS segment descriptor 909 (see the fourth column).

Next, at a step 878, the switch code 954 restores the host context by restoring all of the registers of the CPU 102, as described in the '847 patent and in connection with the step 802 of FIG. 5A above. Next, at a step 880, the switch code 954 executes an instruction that causes the IP to point to code in the driver VMdrv 242 that is in the host virtual address space 924, and no longer in the switch page 926F. The destination address for the instruction may change from time to time. Executing the instruction also causes the CS register 902 to be loaded with a value that points to the H-CS segment descriptor 908. The fourteenth row of the table in FIG. 6B shows that, after the step 880 (see the first column), the CS register 902 now points to (and contains) the H-CS segment descriptor 908 (see the third column).

The method of FIG. 6A terminates at a step 882. At this point, the switch routine has successfully performed a context switch from the virtual context to the host context, and changed the operating mode of the CPU 102 from the legacy mode to the long/64-bit mode. Next, execution returns to the host OS 220, either directly from the driver VMdrv 242 or from the application VMapp 500.

Figure 7:
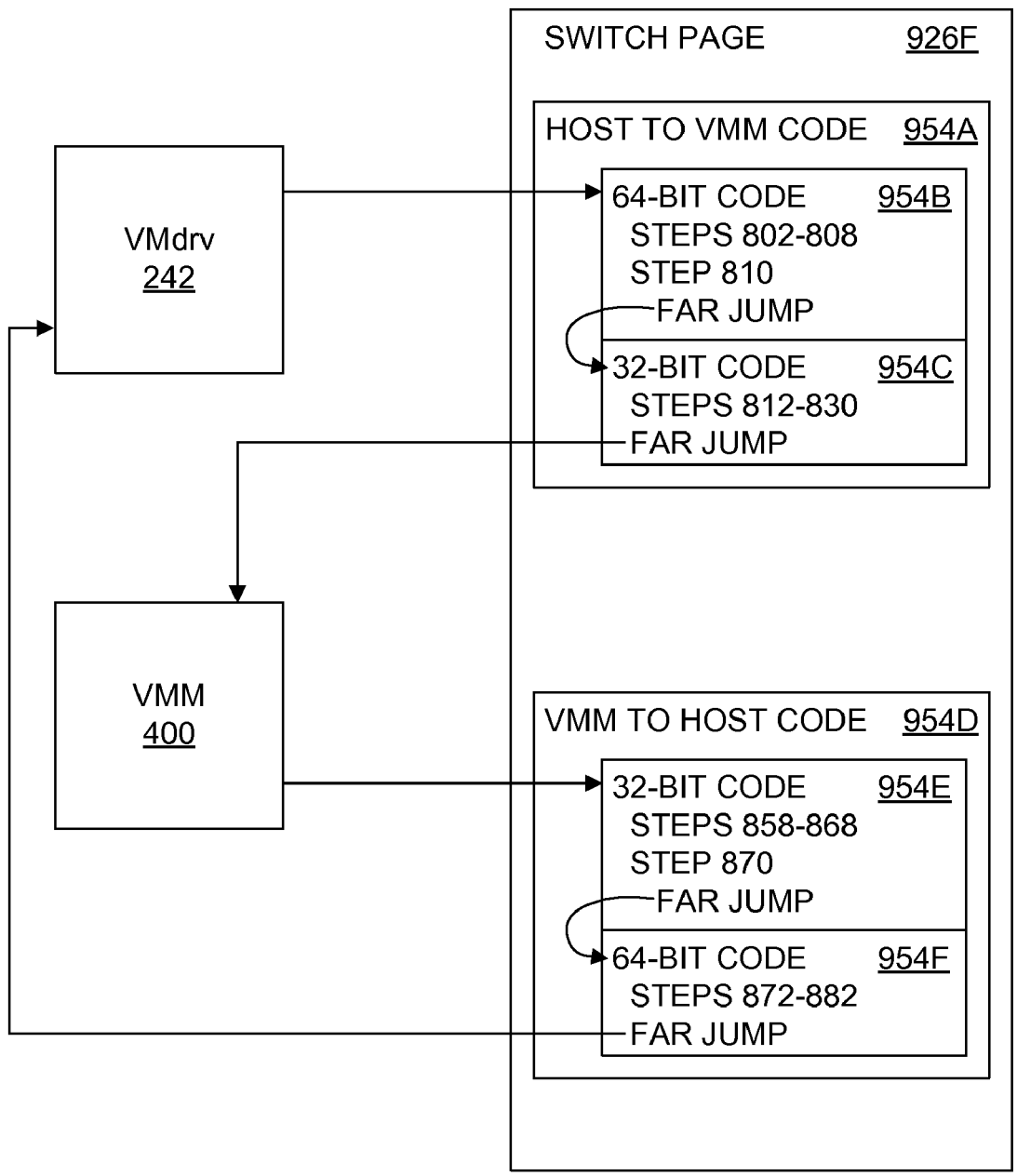
FIG. 7 illustrates the general structure and operation of a switch code in accordance with one or more embodiments of the present invention.

FIG. 7 illustrates the general structure and operation of the switch code 954. FIG. 7 shows the driver VMdrv 242, the VMM 400 and the switch page 926F. Within the switch page 926F, FIG. 7 shows a first portion 954A and a second portion 954D of the switch code 954. The first portion 954A performs the method of FIG. 5A to switch from the host context to the VMM context, while the second portion 954D performs the method of FIG. 6A, along with some code in the VMM 400, to switch from the VMM context to the host context. The first portion 954A comprises a set of 64-bit code 954B and a set of 32-bit code 954C, all in contiguous physical memory in the switch page 926F. The second portion 954D comprises a set of 32-bit code 954E and a set of 64-bit code 954F, all in contiguous physical memory in a different region of the switch page 926F.

At the beginning of the switch from the host context to the VMM context, the driver VMdrv 242, which is executing in 64-bit mode, calls into the beginning of the 64-bit code 954B. The 64-bit code 954B then executes the steps 802, 804, 806 and 808 of the method of FIG. 5A. Next, at the step 810, the 64-bit code 954B performs a far jump to the very next instruction in the physical memory of the switch page 926F, which is the first instruction in the 32-bit code 954C. As described above, this far jump also causes the CPU 102 to switch from the 64-bit mode to the compatibility mode. The 32-bit code 954C then executes the steps 812, 814, 816, 818, 820, 822, 824, 826, 828 and 830 of the method of FIG. 5A. As described above, disabling memory paging at the step 812 causes the CPU 102 to switch from the compatibility mode to the legacy mode. After the step 830, the 32-bit code 954C performs a far jump to a location within the code of the VMM 400, which continues executing in the 32-bit legacy mode.

At the beginning of the switch from the VMM context to the host context, the VMM 400, which is executing in 32-bit legacy mode, first performs the steps 852, 854 and 856 of the method of FIG. 6A. Next, at the step 857, the VMM 400 jumps to the beginning of the 32-bit code 954E. The 32-bit code 954E then executes the steps 858, 860, 862, 864, 866 and 868. As described above, enabling long mode and memory paging at the steps 864 and 866, respectively, causes the CPU 102 to switch from the legacy mode to the compatibility mode. Next, at the step 870, the 32-bit code 954E performs a far jump to the very next instruction in the physical memory of the switch page 926F, which is the first instruction in the 64-bit code 954F. As described above, this far jump also causes the CPU 102 to switch from the compatibility mode to the 64-bit mode. The 64-bit code 954F then executes the steps 872, 874, 876, 877, 878, 880 and 882 of the method of FIG. 6A. After the step 882, the 64-bit code 954F performs a far jump to a location within the code of the driver VMdrv 242, which continues executing in the 64-bit mode and returns control to the host OS 220.

As described above, this invention enables the 32-bit VMM 400 of the 32-bit Workstation product to operate in a 64-bit environment, and virtualize a 32-bit x86 VM 300. The VMM 400 provides the same basic functionality in the 64-bit environment as it does in the 32-bit x86 environment. The virtualization, however, is performed using multiple operating modes of the CPU 102. First, the VMM 400 executes in legacy mode to emulate an x86 virtual CPU 302. Suppose now that a guest application 360 within the VM 300 attempts to access a virtual device 310 in the virtual system hardware 301. The CPU 102 is also in the legacy mode when the application 360 is executing, and the device emulators 410 are implemented using the legacy mode. If the device access is to be handled by the host OS 220, then the VMM 400 calls to the switch code 954 to initiate a switch to the host context. As described above, the switch code 954 switches the CPU 102 to the compatibility mode and then to the 64-bit mode in making the switch to the host context. The driver VMdrv 242 then calls to the application VMapp 500, which makes a system call to the host OS 220 to emulate the attempted device access from the guest application 360. The application VMapp 500 may operate in either the compatibility mode or the 64-bit mode. A driver 240 in the host OS 220, which executes in the 64-bit mode, responds to the system call and executes the emulated device access in the 64-bit system hardware 100. Thus, an attempted device access in the 32-bit environment of the VM 300, which is emulated by the VMM 400 executing in legacy mode, is actually implemented by a device driver 240 executing in 64-bit mode in the 64-bit environment of the physical system 100.

The methods of FIGS. 5A and 6A relate to the virtual computer system illustrated in FIG. 1, and they relate to switching between the 64-bit host OS 220, operating in the long/64-bit mode of the x86-64 CPU 102, and the 32-bit VMM 400 operating in the legacy mode. However, a person of skill in the art will be able to adapt the methods for a wide variety of other situations. For example, the same techniques may be applied to other processors that implement a new operating mode and a legacy operating mode, where a host OS operates in the new operating mode and a VMM operates in the legacy operating mode. In particular, adapting the methods to work with an Intel EM64T processor is quite straightforward. The techniques may also be applied to other processors, however. In addition, the techniques may be applied to computer systems that have multiple processors, such as known Symmetric Multiprocessor Systems.

Also, the techniques may be adapted for use with other software entities on the x86-64 processor or on other processors. For example, this invention may be used with a wide variety of other types and structures of virtualization software. For example, the invention may also be used in the virtual computer system illustrated in FIG. 2, or in other systems that have the same basic architecture as the system of FIG. 2. For example, the kernel 700 may be a 64-bit kernel or a 32-bit kernel. Also, the kernel 700 may support multiple VMMs 400, zero or more of which may be 32-bit VMMs and zero or more of which may be 64-bit VMMs. Also, the console OS 220B may be a 32-bit OS or a 64-bit OS. The methods of FIGS. 5A and 6A may be used for any transition that involves a total context switch between any one of the 32-bit software entities and any one of the 64-bit software entities in such a system. Thus, the methods may be used to switch between a 64-bit kernel 700 and a 32-bit console OS 220B, between a 64-bit kernel and a 32-bit VMM 400, between a 64-bit console OS 220B and a 32-bit kernel 700, between a 64-bit console OS 220B and a 32-bit VMM 400, between a 64-bit VMM 400 and a 32-bit console OS 220B, between a 64-bit VMM 400 and a 32-bit kernel 700, and between a 64-bit VMM 400 and a 32-bit VMM 400. In such a system, all of the system hardware 100, including the devices 110, is shared between one or more 32-bit software entities and one or more 64-bit software entities. For example, a 32-bit console OS 220B may attempt to access a SCSI device. If a 64-bit kernel 700 handles the interface with the SCSI device, then the kernel 700 intercepts the attempt by the console OS 220B to access the SCSI device. A total context switch according to the invention is performed to switch from the context of the console OS 220B to the context of the kernel 700. The kernel 700 then emulates the attempted SCSI device access on behalf of the console OS 220B. If data is subsequently returned from the SCSI device to the console OS 220B, the kernel 700 again provides an interface between the SCSI device and the console OS 220B. Another context switch according to the invention, but in the opposite direction, may be used to switch from the context of the kernel 700 back to the context of the console OS 220B to deliver the data from the SCSI device.

Also, the invention may be used for switching software entities that don't even involve virtualization. For example, adaptations of the methods of FIGS. 5A and 6A may be used to switch between a first OS that operates in a new operating mode, such as the long/64-bit mode of the x86-64 processor, and a second OS that operates in a legacy operating mode, such as the legacy mode of the x86-64 processor. Each of the first and second OSs could have provisions for calling a switch routine that performs adaptations of the methods of FIGS. 5A and 6A, along with provisions to ensure that the first and second OSs do not interfere with each other, or with the switch routine. As one particular example, a 64-bit version of Linux may be executed on an x86-64 processor in the long/64-bit mode, along with a 32-bit version of Linux, executed in the legacy mode, with the Linux versions being customized to work with each other and with a switch routine.

The invention may also be used to switch between more than two software entities. For example, additional VMMs may be added to the virtual computer system, and the methods of the invention may be used to switch between the multiple VMMs and the host OS 220. The multiple VMMs may differ substantially from one another too. For example, one or more of the VMMs may run on top of a kernel 700 as illustrated in FIG. 2, while one or more other VMMs use a hosted configuration, such as the one illustrated in FIG. 1. As yet another example, a 64-bit VMM may also be added to the virtual computer system, and the methods of the invention may be used to switch between the host OS 220, a 32-bit VMM and the 64-bit VMM, with the host OS 220 and the 64-bit VMM operating in the long mode and with the 32-bit VMM operating in the legacy mode.

What is claimed is:

1. A computer program embodied in a non-transitory computer storage medium, the computer program being executable in a computer system, the computer system comprising a processor having a first operating mode and a second, legacy operating mode, the legacy operating mode being suitable for executing a legacy application and a legacy operating system (OS), the computer system further comprising a host OS that is executable on the processor in the first operating mode, the computer program comprising:

a virtualization software that is executable on the processor in the legacy mode, the virtualization software supporting a virtual machine (VM) having a virtual legacy processor on which a legacy OS and a legacy application can run; and a switch routine for switching between the host OS that executes on the processor in the first operating mode and the virtualization software that executes on the processor in the legacy operating mode, the processor including a first instruction set for the first operating mode and a second instruction set for the legacy operating mode, the switching includes switching from the first instruction set to the second instruction set and switching paging tables, each of the first operating mode and the legacy operating mode having separate paging tables, wherein the switch routine is incorporated in a switch page that is locked in physical memory, and the switch routine includes instructions that are executed with memory paging disabled and employs an identity mapping to map a virtual page having a virtual page number to a physical page having a physical page number that is the same as the virtual page number to locate additional instructions in the physical memory.

2. The computer program of claim 1, further comprising a driver loaded in the host OS for initiating the switch routine from the host OS.

3. The computer program of claim 2, wherein the switch routine is a part of the driver.

4. The computer program of claim 1, further comprising a driver loaded in the host OS and a host application that executes on the host OS, the host application being schedulable by the host OS and calling into the driver to initiate the switch routine.

5. The computer program of claim 4, wherein the processor also has a compatibility mode that is suitable for executing a legacy application on an OS that is executable on the processor in the first operating mode, and wherein the host application is a legacy application that executes on the processor in the compatibility mode.

6. The computer program of claim 4, wherein the driver and the host application are also used to enable the virtualization software to use the host OS to access a physical device.

7. The computer program of claim 1, further comprising a switch page table that contains first identity mapping that is used when disabling memory paging when switching between the host OS that executes on the processor in the first operating mode and the virtualization software that executes on the processor in the legacy operating mode.

8. The computer program of claim 7, further comprising a second identity mapping that is loaded into a page table of the virtualization software.

9. The computer program of claim 7, further comprising a switch segment descriptor table that is used when switching between the host OS that executes on the processor in the first operating mode and the virtualization software that executes on the processor in the legacy operating mode.

10. The computer program of claim 1, wherein the switch routine comprises a switch page that contains a first portion of code that is executable on the processor in the first operating mode and a second portion of code that is executable on the processor in the legacy operating mode.

11. The computer program of claim 10, wherein the first portion of code and the second portion of code are contained in contiguous physical memory on the switch page.

12. A method for switching from a second software entity executing in a legacy mode of an x86-64 processor to a first software entity executing in a 64-bit mode of the processor, the first and second software entities both running at the same system level of the processor, the first software entity and the second software entity each executing with memory paging enabled, the first software entity using a first page table, the second software entity using a second page table, the method comprising:

a) switching to fetch instructions from a switch page using a first identity mapping for the switch page, the first identity mapping being inserted in the second page table and providing a mapping from a virtual page having a virtual page number to a physical page having a physical page number that is the same as the virtual page number;

b) disabling memory paging;

c) activating a switch page table, the switch page table being different from the first and second page tables, the switch page table including a second identity mapping for the switch page;

d) enabling a long mode of the processor;

e) enabling memory paging, which causes the processor to switch to a compatibility mode;

f) switching to the 64-bit mode of the processor;

g) activating the first page table; and h) loading a plurality of registers of the processor with values for the first software entity, to restore a context of the first software entity.

13. The method of claim 12, wherein the steps a), b), c), d), e), f), g) and h) are performed sequentially, in alphabetical order.

14. The method of claim 12, further comprising, before the step a), saving a virtual address mapping of the second software entity from the second page table.

15. The method of claim 14, further comprising, before the step a), saving the plurality of registers of the processor to save a context of the second software entity.

16. The method of claim 12, wherein the first software entity is a host operating system and the second software entity is a virtual machine monitor in a virtual computer system.

17. The method of claim 12, further comprising, after the step a), activating a switch segment descriptor table and, after the step e), loading a first data descriptor into a data segment register, the first data descriptor specifying a first data segment that includes the switch page.

18. The method of claim 17, further comprising, after the step f), activating a segment descriptor table for the first software entity and, after the step g), loading a second data descriptor into the data segment register, the second data descriptor specifying a second data segment of the first software entity.

19. The method of claim 18, further comprising, after the step h), loading a code descriptor into a code segment register, the code descriptor specifying a code segment of the first software entity.

20. The method of claim 12, further comprising, after the step f), performing a jump instruction to a virtual address of the first software entity that maps to the switch page.

* * * * *